Jan. 28, 1930. W. L. PIPES 1,745,116
MULTIPLE FASTENING DEVICE
Filed July 24, 1926
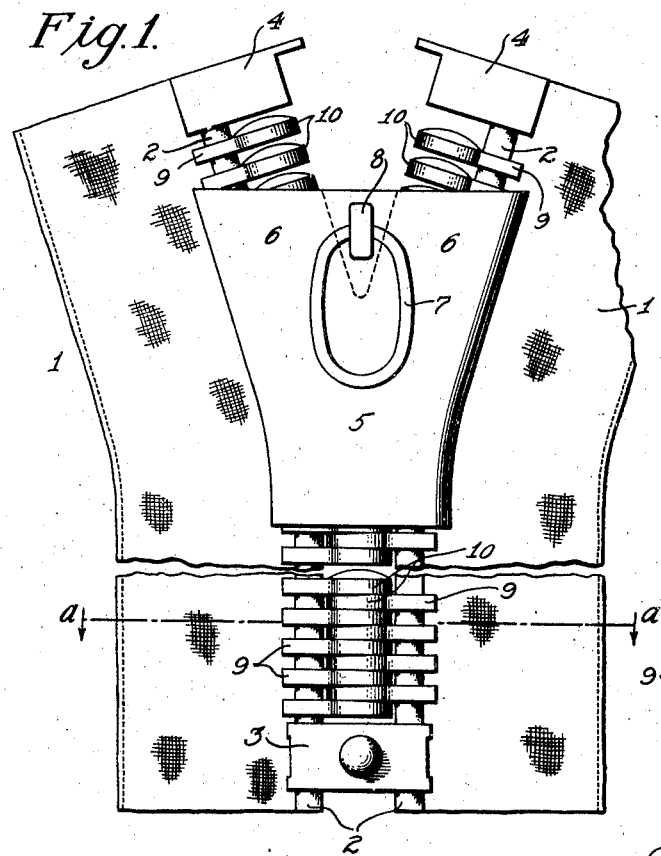
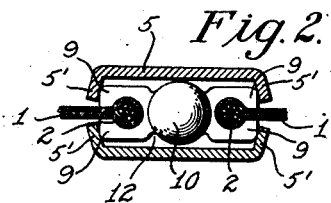
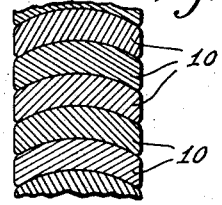
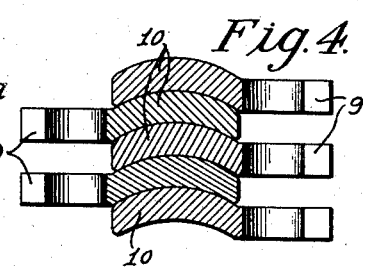
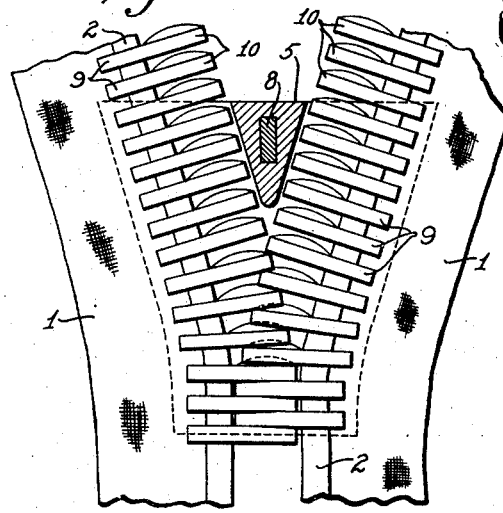
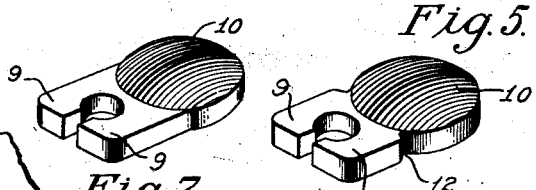
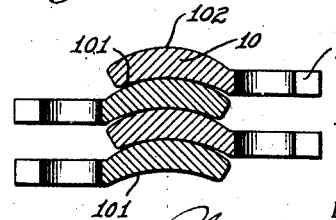

Patented Jan. 28, 1930

1,745,116

UNITED STATES PATENT OFFICE

WALTER L. PIPES, OF ELIZABETH, NEW JERSEY, ASSIGNOR TO THE SHOE HARDWARE COMPANY, OF WATERBURY, CONNECTICUT, A CORPORATION OF CONNECTICUT

MULTIPLE FASTENING DEVICE

Application filed July 24, 1926. Serial No. 124,757.

This invention relates to separable fasteners and particularly to that type of fastener for overshoes, garments, automobile curtains and other purposes where two flexible stringers are locked and unlocked by a sliding cam device, the locking being effected by travel in one direction and unlocking by an opposite movement.

The object of the invention is to provide a simple form of locking device which will be light in weight, small in size, cheap to manufacture and less wearing on swaging dies and which, when properly positioned on stringers, will produce a strong yet highly flexible fastener. It may be made large in size as well as small, and is readily adaptable for a wide range of uses.

A feature of the invention is the saucer shape of the locking members, which provides a simple yet strong locking means and permits them to be engaged or disengaged with a minimum of lift, thus insuring reliability and ease of operation by the sliding device.

Another feature of the invention lies in the smooth rounded surface of the locking members whereby a bearing surface with a relatively large radius of curvature is provided which not only insures durability but also allows the members to be rotated angularly with respect to one another about their line of nested relation without decreasing the locking strength of the fastener.

According to the present invention, the locking members are all alike and are therefore interchangeable. The stringers may be of any suitable type but preferably consist of a fabric tape having a beaded or corded edge upon which the locking members are clamped. The locking members consist of contractable jaw portions adapted to be clamped upon the tape and engageable portions of saucer shape, the concave surface of one member fitting more or less snugly over the convex surface of another member when in locked relation. The members secured to one stringer alternate with those on the other so that when the sliding device is moved back and forth the locking members will be engaged and disengaged according to the direction of movement.

The invention resides particularly in the form of the engageable portions of the locking members, the saucer like shape of which causes the contacting members to meet in an edge, the smooth and evenly rounded surface causing the members to move over one another into locking position smoothly and readily and without catching. A very snug fit is thereby attained preventing lateral or longitudinal displacement, and at the same time, because of the smooth bearing surface of the contacting portions, one member may rotate freely with respect to its adjoining members without disengaging.

Fig. 1 is a plan view on an enlarged scale of a fastener embodying the invention;

Fig. 2 is a cross section on line a—a of Fig. 1;

Fig. 3 is an enlarged view showing a transverse section of the locking members;

Fig. 4 is an enlarged view of a longitudinal section of the locking members showing their staggered arrangement;

Fig. 5 is a detailed view of one of the locking members;

Fig. 6 is a detailed view showing the manner of locking and unlocking;

Fig. 7 is a detailed view showing a modification of the locking members shown in Fig. 5; and Fig. 8 is an enlarged detailed view of the locking members showing a modification of the arrangement in Fig. 4.

Referring to Fig. 1, it will be seen that the stringers 1—1 have enclosed in folds at their opposed edges cords 2 upon which the interlocking members are securely fastened. The locking members may be secured to the fabric or margins of the opening of the article to which the fastener is applied in any suitable and convenient manner and the invention is not to be understood as limited to the manner of application or mounting disclosed in the drawings. For instance, instead of the construction illustrated, the locking members may be strung on a cord and then passed or "filtered" through slots formed in a piece of fabric by drawing out or otherwise removing a number of warped threads so that the filling threads can be passing singly or in groups between pairs of the locking members, in a manner which is old in the prior art. The stringers may be secured together at one end by a fastening link such as 3 and will have suitable stopping members such as 4 at the opposite end to limit the movement of the slider. A sliding cam operating device 5, many varieties of which are well known, is mounted upon both stringers. Preferably it will be of Y shape, branches 6 being separately mounted on each stringer thus forming a guide which, upon movement in one direction, serves to engage the locking members and upon movement in the other direction to disengage them. The slider may be operated by means of a ring 7 secured to it by a rivet 8 or otherwise, as convenient.

Fig. 5 represents one of the locking members, having a slotted portion, which consists of the jaws 9, and a saucer shaped portion 10 which constitutes the engageable means. This form of member, shown substantially circular in shape but its shape may be varied in face view, convex on one surface and concave on the other, is especially adaptable as a locking means for separable fasteners. Since the strength of the union formed by the interlocking of any two members is directly proportional to the curvature of the engageable members, the binding power of the device may be readily adjusted according to the use to which the fastener is to be put by increasing or decreasing the curvature of the engageable members. In practice it has been found that when a large number of these engageable members are drawn together in nested relation a very slight curvature is sufficient to give a very firm lock; and the uses to which such fasteners are ordinarily put require flexibility as well as binding strength. Thus, in an overshoe, when the two flaps are joined together, it is desirable that the fastening device as a whole when closed may be readily flexible longitudinally to accommodate bending of the foot and also that it be flexible transversely to conform with the shape of the wearer's leg. Because of the saucer shape, the contacting members are capable of accommodating longitudinal flexing of the foot and permit it to bend very readily. The relatively shallow dishing of the saucer shaped portions 10, which are interengaged with one another when the elements or members are nested and the opening in the article is closed, while affording the necessary grip against separation permit of the movement of the members or elements into and out of locking relation with a minimum of elevation or lift. This is an improved feature of the invention as it means that the slider or cam operating device 5 may be made with a very low or no angle at all. That is to say, the slider or cam operating device 5 instead of having converging channels which merge together into a single channel, may be made for operation of the specific fastener elements of this invention with a less angle of convergence than heretofore, or with none at all, the upper end only of the slider 5 being rounded to permit the elements to be brought together at an angle outside of the slider. By this feature of the invention, also, the force or power required to engage or disengage the elements is reduced. The advantage of this is that the slider may be made less strong and more cheaply than heretofore possible with multiple fastening devices.

It may be preferred to notch the elements as at 12 in Figs. 2 and 5 of the drawings in order to improve the flexibility of the fastener, and if desired, the operating slider 5 may have its flanges 5' spaced a less distance apart than is shown in Fig. 2 of the drawings in order to reduce the visible width of the slider. And if enough clearance is allowed these notches 12 may be engaged by the flanges 5' on one side only of the nested elements as well as on both sides. A narrow slider, i. e., one having its flanges 5' spaced a less distance apart than the width of the elements in nested relation, may be employed with the form of element shown in Fig. 7, in which case of course the flanges 5' of the slider would be engaged with the shoulder formed at the junction of the saucer-shaped portion 10 with the anchoring portion 9.

In Fig. 7 of the drawings the elements or members are illustrated with their jaw portions 9 of less width than their interengageable or saucer shaped portions 10. And this construction may be employed where the requirements of manufacture indicate it to be of advantage.

Where a premium is placed on flexibility it is preferred to have the radius of curvature of the concave surface 101 greater than the radius of curvature of the convex surface 102, as illustrated in Fig. 8 of the drawings. Where a premium is placed upon holding power, however, the curvature may be reversed, i. e., the radius of the curvature of the surface 101 may be made less than the radius of curvature of the surface 102, which of course would increase the area of gripping contact of the interengaged saucer shaped members 10.

The term "saucer shaped" used in the claims is hereby defined to mean an element the thickness of which is relatively small as compared with its lateral dimensions and which is provided with curved surfaces on its opposite sides, one of the surfaces being concave and the other convex, the surfaces being either circular, oval, elliptical, polygonal or of other suitable outline, the curvatures of the surfaces being of a constant direction although either of a constant magnitude or varying in magnitude and the curvature of the surfaces may be either identical or different within the limit that they are so shaped as to admit of interlocking engagement.

The invention is believed to be broad in scope and is intended to comprehend the above-mentioned variations in construction and all others within the principles underlying the same. For an understanding of the scope of the invention reference will therefore be made to the accompanying claims.

Having thus described my invention what I claim and desire to protect by Letters Patent is:—

1. In a multiple type of fastener, a plurality of like members adapted to be interlocked and disengaged in and from nested relation by a slider, said members having saucer-shaped engageable portions relatively thin in any cross-section, their opposite faces being concavely and convexly curved throughout the extent of their free extremities.

2. In a multiple type of fastener, a plurality of like members adapted to be interlocked and disengaged in and from nested relation by a slider, said members having one piece saucer-shaped engageable portions with unbroken concave and convex surfaces of substantially less than hemispherical extent and co-extensive with the free extremities of the said members.

3. In a multiple type of fastener, a plurality of like members adapted to be interlocked and disengaged in and from nested relation by a slider, said members having saucer-shaped engageable portions with continuous concave and convex surfaces extending to the front and side edges thereof.

4. In a multiple type of fastener, a plurality of like members adapted to be interlocked and disengaged in and from nested relation by a slider, said members having saucer-shaped engageable portions defined on one side by a convex round surface and on the other side by a concave round surface the radius of curvature of said surfaces being at least several times the thickness of the members and the concave and convex surfaces extending to the free extremities and the side edges of the fasteners whereby the members are capable of pivoting relative to one another without being disengaged and the flexibility of the members when in interengaged relation enhanced.

5. In a multiple type of fastener, a plurality of like members adapted to be interlocked and disengaged in and from nested relation by a slider, said members having saucer-shaped engageable portions with concave and convex surfaces extending to the front and side edges thereof and permitting angular rotation of one member upon another.

Signed at New York, county of New York, State of New York, this 13th day of July, 1926.

WALTER L. PIPES.